Dec. 7, 1965  E. WINIGER  3,221,926
MEDIUM CONSUMPTION METERING AND INVOICING MECHANISM
Filed Aug. 24, 1962  4 Sheets-Sheet 1

INVENTOR.
Edgar Winiger
BY
MORGAN, FINNEGAN, DURHAM & PINE
ATTORNEYS

Dec. 7, 1965 E. WINIGER 3,221,926
MEDIUM CONSUMPTION METERING AND INVOICING MECHANISM
Filed Aug. 24, 1962 4 Sheets-Sheet 2

INVENTOR.
Edgar Winiger

BY
MORGAN, FINNEGAN, DURHAM & PINE
ATTORNEYS

Dec. 7, 1965  E. WINIGER  3,221,926
MEDIUM CONSUMPTION METERING AND INVOICING MECHANISM
Filed Aug. 24, 1962  4 Sheets-Sheet 4

INVENTOR,
Edgar Winiger

BY
MORGAN, FINNEGAN, DURHAM & PINE
ATTORNEYS

United States Patent Office 3,221,926
Patented Dec. 7, 1965

3,221,926
MEDIUM CONSUMPTION METERING AND
INVOICING MECHANISM
Edgar Winiger, Lucerne, Switzerland, assignor to Electrometre, S.A., Zug, Switzerland, a body corporate of Switzerland
Filed Aug. 24, 1962, Ser. No. 219,296
Claims priority, application Switzerland, Sept. 15, 1961, 10,704/61
5 Claims. (Cl. 221—2)

This invention relates to metering and invoicing the consumption of media such as electricity, gas and water.

In order to make it simpler and cheaper to charge for the amount of electricty, gas, water or any other medium withdrawn from the supply mains by a consumer in supply installations, it has been proposed to charge for it not at fixed intervals of time, as has been done hitherto almost universally, but rather each time the quantity withdrawn by the consumer has reached a predetermined sum agreed on with the consumer. (It is of course possible, without altering this latter principle, to replace the predetermined quantity of medium by a fixed monetary amount representing the value of the medium consumed.)

Thus according to this proposal fixed-period accounting heretofore widely practised, is replaced by fixed-quantity (amount of medium or equivalent value) accounting. For this purpose apparatus is installed in the consumer's premises and is controlled by a flow meter such as an electricity meter. Each time the reading on the flow meter increases by the predetermined fixed amount, the apparatus automatically prepares for withdrawal, or issues, a bill for the fixed quantity or for the corresponding amount of money. The bill, which is preferably in the form of a card, is then presented by the consumer to the accounts department of the supply utility.

This previously proposed fixed-amount charging system has the great advantage that the consumer no longer needs to be visited periodically, approximately once a month, by an agent of the utility in order for the meter to be read. This saves considerable labor and avoids much inconvenience, e.g., inability to gain access to the consumer's meter. A further great advantage is that, for the individual consumer or even for a large group of consumers, the accounts department has only to deal with bills for one and the same amount. This particularly makes it easier or even profitable to install mechanical means for dealing with the bills, especially if these are in card form.

In the previously proposed accounting method the bills do not of course come in at regular intervals. Particularly in the case of consumers with a widely fluctuating consumption rate, the time elapsing between the receipt of individual bills may in some cases result in large fluctuations in the amount of work to be done by the accounts department. Under certain conditions, therefore, the regular receipt of bills, such as is ensured to a certain extent by the conventional charging method working on the fixed-time principle, may again be regarded as advantageous.

The present invention therefore aims at providing an apparatus for charging for the amount of a medium withdrawn by a consumer from the supply mains in which the advantages of the fixed-amount principle are combined with those of the fixed-period principle. Other objects and advantages of the invention will be set forth in part hereinafter and in part will be obvious herefrom or may be learned by practice with the invention, the same being realized and attained by means of the instrumentalities and combinations pointed out in the appended claims.

The invention retains the fixed amount charging feature, so that bills, preferably in card form, are issued by the charging apparatus in dependence of the quantity consumed as determined by measurement. Each bill is made out for a predetermined consumption amount or the corresponding amount of money, is marked to identify the consumer, and is for a predetermined value. The charging apparatus according to the invention is distinctive, however, in that the issuance of individual bills takes place at least approximately, at equal intervals of time. In order to provide correspondence between the invoice amount charged the consumer on the basis of the bill issued and the amount actually consumed by him at issuance time, there are provided bills of at least two different values. One of these bills is selected by a selector mechanism which is controlled in dependence on the measured consumption.

It is desirable that the charging apparatus according to the invention be designed such that, at the times stipulated for issuing a bill, a bill is issued even if, owing to a lack of further consumption, the consumption measurement result has not changed since the previous bill was issued. This ensures that bills are obtained at regular intervals in all circumstances, which is highly desirable, for example for control reasons. The consumer will generally have to pay a basic charge or meter rent in addition to the cost of the medium consumed. This charge can be included as the lowest value for a bill. Bills of the lowest value are thus issued if there has been no consumption at all in the interim or if the consumption measured is below the limit of a given range. This consumption range is followed by a higher range, and if the amount consumed is within the higher range when the bill is issued, then the bill issued is of the higher value. Thus the number of consumption ranges and corresponding bill values must be at least two, but beyond this can be chosen at will according to circumstances. The highest bill value can correspond to the probable maximum consumption per period of issue. Intermediate values are preferably chosen to correspond approximately with the mean value of the measurement range leading to their issue.

There is usually a difference between the amount charged on the issued invoice and the amount actually consumed by the consumer. This difference can be indicated and made readable as from a counter, and is taken into account in the following charging period. The counter indication may be used for intermediate reading and checking.

With apparatus according to the invention it is also possible, without any appreciable extra expense, to charge jointly for supplies from two or more different mains, for example for the electricity, water and gas used by a consumer, using only one type of bill. This can be done if the readings on the different flow meters are first conveyed to a common tariff apparatus which converts the amounts measured into the corresponding amounts of money on the basis of the tariff applicable to each medium consumed, and then totals the monetary amounts. In dependence on the total amount, the tariff apparatus then controls the selector mechanism in choosing the bills to be issued according to their value.

The invention consists in the novel parts, constructions, arrangements, combinations and improvements herein shown and described.

The invention is further explained below with reference to the accompanying drawings of exemplary apparatus, in which.

Figure 1:
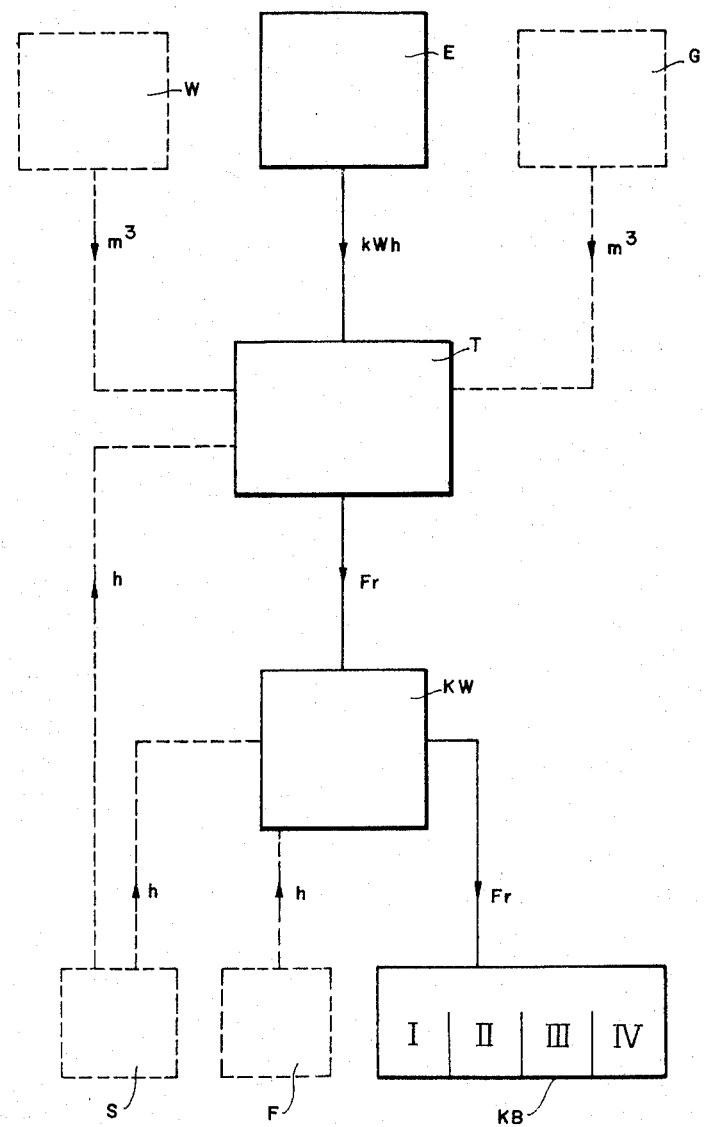
FIGURE 1 is a block diagram of one embodiment illustrating functional instrumentalities and their relationship.

FIGURE 1 is a block diagram showing the interaction of the individual elements of charging apparatus according to the invention. It is assumed that in addition to electricity consumption, the consumption of water and gas are to be charged for with common bills. A water meter W and a gas meter G are accordingy provided as well as an electricity meter E. All three signal their readings at any given time, in cubic meters, and kw.-hr. respectively, to a common tariff apparatus T. The tariff apparatus T converts the measurements signalled to it into the corresponding amounts of money on the basis of the rates in force for the separate media, and totals these amounts. It is quite unnecessary in the illustrated arrangement for the unit rate for the individual media to be constant; as symbolized by the line $h$ running from time switch S to the tariff apparatus T, the individual rates can be altered by the switch as a function of time.

The starting value of the tariff apparatus T, expressed, for example, in dollars, is then transferred to a selector KW, which is referred to as a card selector on the assumption that the bills issued are in the form of cards. At approximately equal intervals of time the card selector KW receives a command, either from the time switch S or through a central remote control device F, and is thereby actuated to select and issue a card of suitable value from the invoice cards in a multiple card container KB. Selection and issuance is made according to the inputs to the tariff apparatus T and the corresponding monetary amount. As illustrated, four card dispensers I to IV are provided each being capable of dispensing cards of a different value. A card from dispenser I is taken as being of the lowest value and a card from dispenser IV is taken as being of the highest value. It should be emphasized that it is not absolutely necessary to provide the tariff apparatus T since if the rate is constant, the card selector KW can be controlled directly by a flow counter.

Figure 2:
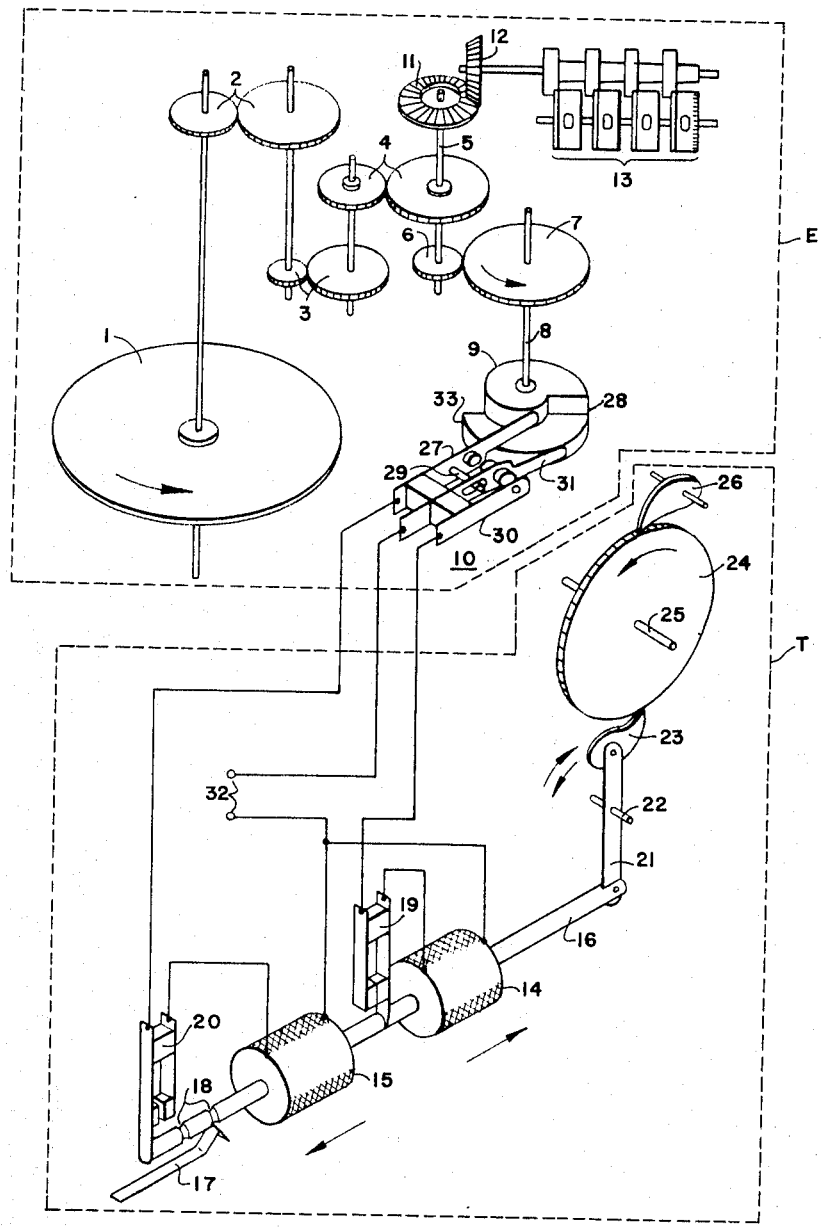
FIGURE 2 is a schematic perspective view illustrating the control of an intermittent stepping mechanism by a rotary member of a flow meter.
Figure 3:
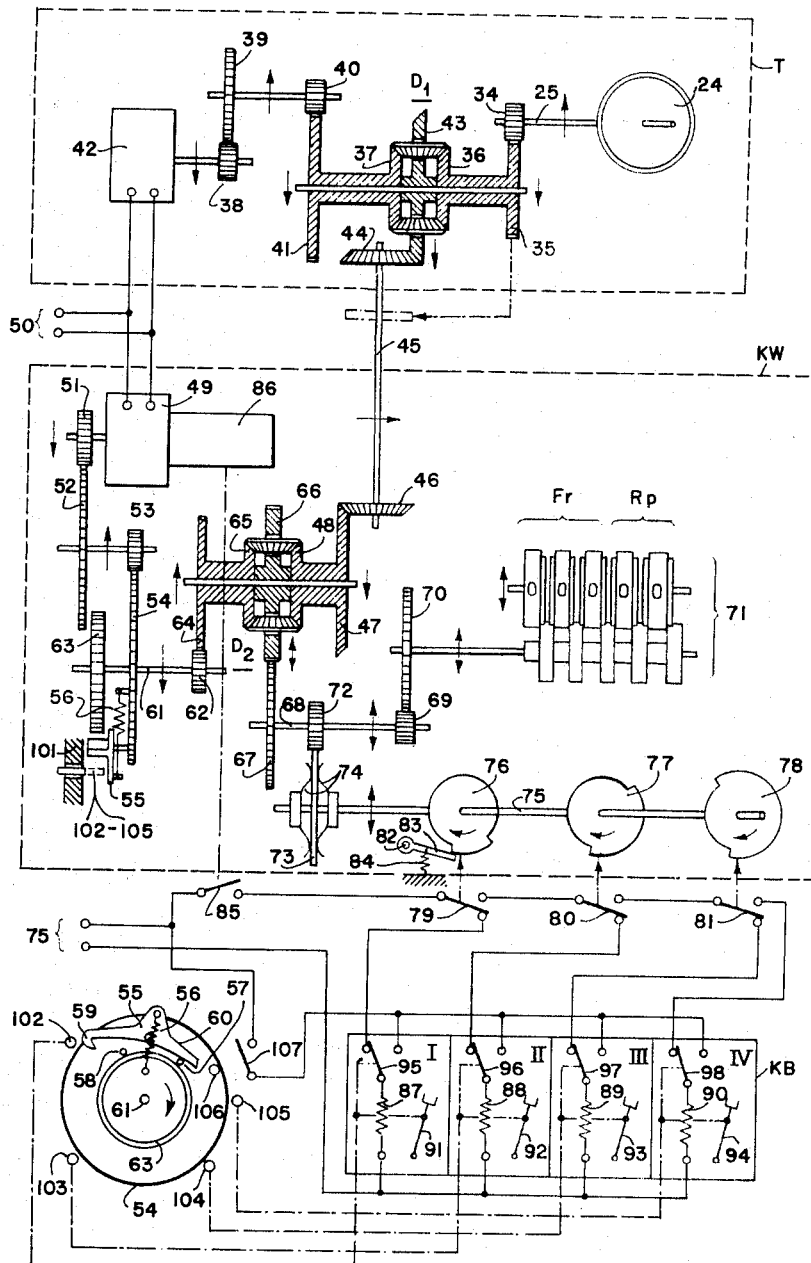
FIGURE 3 is a schematic view illustrating details of tariff apparatus, a card selector and a multiple card container.
Figure 4:
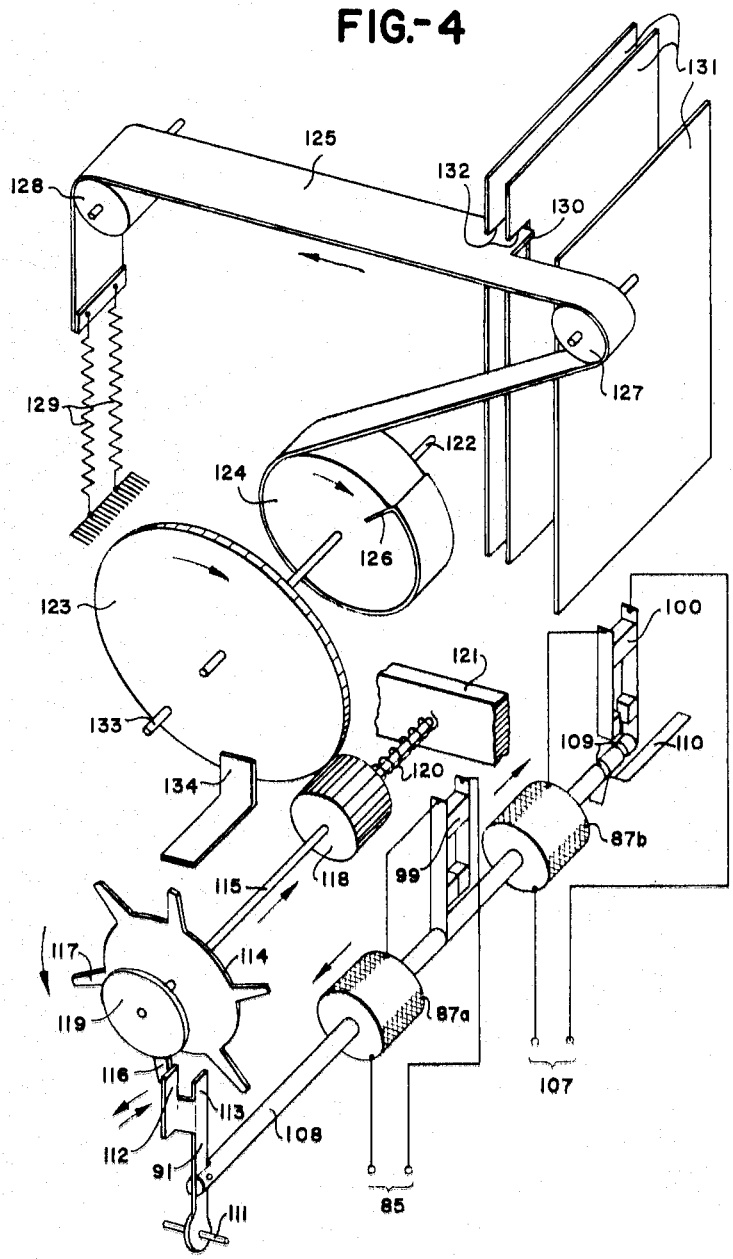
FIGURE 4 is a schematic perspective view illustrating an exempary electromagnetic card ejector.

Further details of the invoice rendering apparatus according to the invention are shown in FIGURES 2 to 4 which, when taken together, illustrate a complete system for periodically rendering invoices in accordance with consumption of electricity.

FIGURE 2 shows the functional Group E and part of the functional Group T. As electricity is consumed the driving disc 1 of an electricity meter (not otherwise shown) turns in the direction of the arrow and drives a shaft 5 through pairs of gears 2, 3, 4. On the shaft 5 there is mounted a gear 6 which drives a gear 7 on a shaft 8. The latter carries a trip cam 9 to operate a switch 10. It is desirable to make the pair of gears 3 of interchangeable character to permit adjustment of the electricity tariff. Unit consumption produces a complete revolution of the shaft 8.

The shaft 5 also drives a counter 13 through bevel gears 11 and 12.

The switch 10 controls the energizing current of two coils 14 and 15, each of which in the energized condition draws a thrust rod 16 in the direction of the arrow shown adjacent the respective coil. The two end positions of the thrust rod 16 are determined by a detent 17 which engages in grooves 18 in the rod. In the end positions of the thrust rod 16, the supply of current to the coil which has drawn the rod into the appropriate end position is in each case interrupted by means of the respective contacs 19 or 20 operated by the rod.

Coupled with the thrust rod 16 is a lever 21 which is pivotally mounted on a shaft 22 and the upper end of which carries a flexibly mounted pawl 23 which is kept in permanent engagement with a ratchet wheel 24 by a spring (not shown). The wheel 24 is fixed to a shaft 25. A pawl 26 prevents the wheel 24 from returning.

The trip cam 9 is shown in a position where the contact spring 27 of the switch 10 has just dropped over one edge 28 of an upper cam plate. As a result of the concomitant withdrawal of an insulated striker 29 fixed on the contact spring 27, the contact spring 30 becomes biased against the contact spring 31, so that the coil 14 receives current through the contact 19 from a voltage source indicated at 32. The coil thus urges the thrust rod 16 to the right. This movement of the thrust rod 16 moves the pawl 23 to the left through the lever 21 causing it to move by one tooth pitch. During this movement the pawl 26 prevents the wheel 24 from turning with pawl 23.

If the cam 9 continues turning, then after a further half revolution thereof, the contact spring 31 drops over one edge 33 and abuts against the contact spring 27. In this way the coil 15 receives voltage via the contact 20 and returns the thrust rod 16 to the left. This action opens contact 20 and recloses contact 19. During the leftward movement of the thrust rod 16, the pawl 23 moves to the right and thus turns the wheel 24 a given angular amount in the direction of the arrow.

FIGURE 3 illustrates further details of the tariff apparatus T and the card selector KW shown in the block diagram in FIGURE 1. It also shows the multiple card container KB in simplified form.

FIGURE 3 also shows the shaft 25, which was turned by the arrangement shown in FIGURE 2. It will be remembered from the preceding description that when electricity is being consumed the shaft 25 turns through a specific angular distance for each kilowatt-hour consumed. On this shaft there is mounted a pinion 34 engaging a gear 35. These gears are interchangeable so that the price per kilowatt-hour can be taken into account. The gear 35 is coupled to one sun gear 36 of a differential gear D1, the other sun gear 37 of which is driven by a constantly running synchronous motor 42 through gears 38 to 41. The planet gears which orbit about sun gears 36 and 37 are mounted on a planet carrier which is in the form of a bevel gear 43. As is characteristic of a differential gear system rotation of the planet carrier is proportional to the sum of the sun gear rotations. Bevel gear 43 drives one sun gear 48 of a second differential gear D2 through a bevel gear 44, a shaft 45 and a pair of bevel gears 46, 47.

The output of differential D2 drives a shaft 68 via gears 66 and 67. Shaft 68 drives a counter 71 through pinion 69 and gear 70.

On the shaft 68 there is also seated a pinion 72 meshing with a gear 73. The latter is connected to a cam shaft 75 through a friction coupling 74. The cam shaft 75 carries three cams 76, 77 and 78, which operate single pole double throw switches 79, 80 and 81 respectively. A lever 83 which is mounted for rotation about the point 82 is urged by a spring 84 against the cam 76. In the circuit of the switches 79–81 there is also a switch 85, which is operated by the synchronous motor 49 through a reduction gear 86 (indicated only diagrammatically) in a manner which will be described later. The switches 79 to 81 control the issuance of the respective bill in accordance with the degree of rotation of cam shaft 75 which it will be remembered is controlled in turn by the output of the consumption meter.

The multiple card container KB comprises four identical separate containers I–IV, each having an electromagnetically actuated card issuing mechanism, as described below with reference to FIGURE 4. Here the mechanisms are indicated only diagrammatically; they comprise coils 87–90, forks 91–94 actuated thereby and switches 95–98. It will be seen from FIGURE 4 that the coils 87–90 in fact each comprise two coils, e.g., 87a and 87b. Each of the four switches 95–98 corresponds to two contacts 99 and 100 in FIGURE 4.

Means for resetting the cam shaft 75 and counter 71 are also provided, a side elevation being shown in the middle of FIGURE 3 and a partial front elevation being shown in the lower portion of FIGURE 3. Accordingly, there is a synchronous motor 49, permanently connected to a voltage source 50 which drives a gear 54 through gears 51, 52 and 53. Mounted on the gear 54 is a pivotable ratchet lever 55 which, subject to the pull of the spring 56, can be tipped across a dead-center position into either of two positions defined by two stops 57 and 58 (see elevation at bottom left). The left-hand side of the ratchet lever 55 carries a ratchet tooth 59 and the right-hand side a sliding surface 60.

The gear 54 is mounted for loose rotation on a shaft 61, whereas a pinion 62 and a ratchet wheel 63 are rigidly mounted on the shaft 61. The pinion 62 is coupled through a gear 64 to the left-hand sun gear 65 of the second differential gear D2 which drives the counter 71 and cam shaft 75 as noted above.

As seen in FIGURE 3, pins 102 to 105 are arranged at the periphery of the gear 54 and mounted on a stationary member 101 so that they can be advanced or extended selectively. If one of the pins is advanced, so that the left arm of the ratchet lever 55 strikes it, the lever 55 is tilted out of the position shown into a position where the tooth 59 engages in the ratchet wheel 63 and thus couples it to the gear 54. Accordingly, gear 54 rotates and eventually the sliding surface 60 of the ratchet lever 55 strikes a decoupling pin 106, thus tilting the lever 55 back into the position shown. At the same time the decoupling pin 106 temporarily closes the contact 107 coupled thereto.

As indicated by the dash-and-dot lines, the coupling pins 102–105 are coupled to the forks 91–94 of the card issuing mechanisms I–IV in such a way that, as soon as the preliminary release of a card takes place, the coupling pin associated with that card issuing mechanism is advanced. The result is that, at the point on the periphery of gear 54 where the advanced pin is located, the ratchet lever 55 tips over into the coupling position, where it remains until upon further rotation its sliding surface strikes against the decoupling pin 106. When this occurs, ratchet lever 55 is returned to its resting position as shown in FIGURE 3 to thereby disengage gear 54 from ratchet wheel 63. At the same time contacts 107 are closed to send a signal to that one of the card issuing mechanisms associated with the advanced pin to thereby cause the associated fork (one of the forks 91–94) to return to its initial position and retract the advanced pin. Thus the angular distance between the advanced one of the coupling pins 102–105 and the decoupling pin 106 determines the angle of rotation through which the ratchet wheel 63 is carried along by the gear 54.

The coupling pins 102–105 are positioned at the periphery of the gear 54 so that the angle of rotation of the ratchet wheel 63, determined by the particular coupling pin which is advanced, corresponds to the value of the concurrently dispensed invoice. It will easily be seen from the arrows in the drawing that the effect of the ratchet wheel 63 being carried along the gear 54 is to transfer to the cam shaft 75, through the second differential gear D2, a rotary movement in the opposite direction to that emanating from rotation of the shaft 25.

If the left hand sun gears 37 and 65 of the two differential gears D1, D2 are thought of as being stationary, then the rotation of the cam shaft 75 corresponds to that of the wheel 24, which in turn is related to the consumption of electricity. The counter 71 rotates correspondingly and indicates the accumulated total at any given moment. The locations of the dwells on cams 76, 77 and 78 are related to the values of the invoice cards dispensed by mechanisms II, III and IV. If the cams are in the position shown with switches 79, 80 and 81 in the lower switching position when the switch 85 is closed, a card from dispenser I is released for issue. If consumption has increased so much that the cam 76 transfers the switch 79 from the on position a card from dispenser II is released when switch 85 is closed. If, finally, the movable contact of the switch 81 has also dropped over the rear edge of the cam 78, then when the switch 85 is closed a card of the highest value is released from dispenser IV. Thus even if nothing has been consumed a card of the lowest value is released.

Each time a card is released through actuation of one of the forks 91–94, the advancing of the associated coupling pin of the group 102–105 causes the racthet wheel 63 to be carried along by the gear 54 through an angle of rotation corresponding to the value of the released card and thus, through the second differential gear D2, causes both the cam shaft 75 and the counter 71 to be set back the amount of the value of the issued invoice. It is consequently always possible to read from the counter 71 the residual amount not represented by the bill, i.e., the difference between total consumption and the consumption represented by the issued card. Thus, if total consumption is seven kw.-hr. and the issued card represents a bill for five kw.-hr., then the counter and cam shaft are reset to the residuum, i.e., two kw.-hr.

When the return movement has been completed the ratchet lever 55 closes the contact 107 by abutting the pin 106, whereby the release of the preselected card is finally completed.

From the synchronous motor 42 through the first differential gear D1, an additional constant rotary speed is superimposed on the cam shaft 75. This rotary movement enables a basic charge or meter rent proportional merely to time to be included in the charge. However, the motor 42 and associated gearing may be omitted. In this case, the gear acts directly on shaft 45 as indicated by an arrow in FIG. 3.

Should consumption in one reading period unexpectedly be so high that the cams 76–78 would make more than one complete revolution, the lever 83, which then strikes against the front edge of the surface of the cam 76, prevents the cam shaft 75 from turning any further after completing one revolution. The cam shaft 75 is thus held in a position where only cards of the highest value are ejected. Owing to the friction coupling 74, however, the counter 71 is not prevented from further turning, so the consumption can still be read therefrom. In this case the cam shaft 75 must afterwards be repositioned by hand to conform to the counter.

FIGURE 4 illustrates an exemplary electromagnetic card ejector, there being one provided for each card group. The coils 87a and 87b correspond to one of the coils 87–90 in the simplified view shown in FIGURE 3; the fork 91 corresponds to one of the forks 91–94.

In the energized condition the two coils 87a and 87b draw a thrust rod 108 in the direction of the arrows shown adjacent the coils. The two end positions of the thrust rod 108 are defined by grooves 109 and a detent 110. Control is effected through contacts 99 and 100, each having one contact spring which is connected to or engageable by the thrust rod 108. The fork 91, which can pivot about a shaft 111, is coupled to the thrust rod 108 and carries two offset abutments 112 and 113 at its upper end. The offset abutments alternately engage prongs of a star wheel 114 on a shaft 115 to thereby permit the star wheel to rotate as thrust rod 108 reciprocates. A pinion 118 and a winding knob 119 are fixed to the shaft 115. A compression spring 120, supported against a bearing 121, presses the shaft 115 constantly to the left against an abutment (not shown). Mounted on a shaft 122 are a gear 123, meshing with the pinion 118, and a drum 124. A steel band 125 is wound on the latter and held in the slot 126.

The steel band 125 runs across rollers 127 and 128 and is constantly held under tension at one end by two springs 129. The steel band 125 is reduced in width so as to form a dropping edge 130. Cards 131, which are arranged at equal intervals in a magazine (not shown), are suspended from the prolongation of the steel band 125 on edges 132 formed by lateral recesses.

An impulse emanating from the contact 85 (FIGURE 3) is fed via the contact 99 to the coil 87a, whereby the coil draws the thrust rod 108 to the left. At the same time the contact 99 is opened and the contact 100 closed. This movement pivots the fork 91 to the left, and the abutment 112 releases the prong 116, the latter thus sliding into engagement with the abutment 113. At this stage the dropping edge 130 of the steel band 125 makes only a small movement in the direction of the arrow, which is not yet sufficient to release a card 131.

If an impulse from the contact 107 follows (FIGURE 3), it is fed through the contact 100 to the coil 87b, and the latter draws the thrust rod 108 back to the right. The star-wheel prong 116 slides off the abutment lug 113, and the star-wheel 114 turns under the action of the springs 129 until its prong 117 strikes the abutment 112. At this movement the dropping edge 130 of the steel band 125 executes such a large displacement that it moves behind the suspension edge 132 of the foremost card and lets the card drop.

The steel band 125 may be rewound by simultaneously pressing and turning the winding knob 119 until a pin 133 strikes a fixed abutment 134. The pressing of the winding knob 119 moves the star wheel 114 backwards, so that its prongs 116, 117 are released from the abutments 112 and 113 whereby it can be turned freely. When the pin 133 engages the abutment 134, the steel band 125 is so far wound up that its dropping edge 130 also covers the foremost card compartment in the magazine and all the cards 131 contained in the completely filled magazine hang from the prolongation of the band.

The invention is not limited to the specific mechanisms shown and described but departures may be made therefrom within the scope of the accompanying claims without departing from the principles of the invention and without sacrificing its chief advantages.

What is claimed is:

1. Invoice rendering apparatus for locally invoicing media consumption comprising, at least one consumption measuring device located at the consumer installation including a movable member operative to provide a displacement indicative of consumption; a plurality of invoice dispensing devices, each of said devices being capable of dispensing an invoice bearing indicia representative of a different predetermined quantity of consumption; first means coupled to said movable member and operative to provide an accumulated total displacement corresponding to said consumption; said first means including means operative to condition that one of said dispensing devices capable of dispensing an invoice representative of the predetermined consumption quantity closest to, but less than, the consumption represented by said accumulated total; periodically actuated means operative to actuate the then conditioned one of said dispensing devices to thereby issue an invoice related to consumption; and means controlled by the actuated dispensing device and operatively connected to said first means to subtract from said accumulated displacement an amount corresponding to the predetermined consumption quantity represented on the issued invoice.

2. Apparatus in accordance with claim 1 wherein one of said invoice dispensing devices is capable of providing an invoice bearing indicia representative of a minimum value and wherein said one invoice dispensing device is actuated when the consumption is unchanged since a previous actuation.

3. Apparatus in accordance with claim 1 wherein said first means provides a visible display corresponding to said accumulated total.

4. Apparatus in accordance with claim 1 further comprising means coupled to said first means for adding to said accumulated total displacement an amount related only to the running of time.

5. Apparatus in accordance with claim 1 further comprising timer means coupled to said periodically actuated means and operative to actuate the same at predetermined time intervals.

References Cited by the Examiner
UNITED STATES PATENTS

| | | | |
|---|---|---|---|
| 408,932 | 8/1889 | Schneider | 221—91 X |
| 520,243 | 5/1894 | Randall | 221—91 X |
| 985,125 | 2/1911 | Bates | 221—15 |
| 1,979,613 | 11/1934 | Goggins | 221—2 |
| 2,050,161 | 8/1936 | Crabb | 221—5 |
| 2,375,602 | 5/1945 | Wickham | 194—3 X |
| 2,872,007 | 2/1959 | Robb et al. | 221—199 X |

FOREIGN PATENTS

| | | |
|---|---|---|
| 280,014 | 10/1926 | England. |
| 870,978 | 3/1941 | France. |
| 894,780 | 10/1953 | Germany. |
| 1,001,076 | 11/1953 | Germany. |
| 1,044,475 | 10/1932 | Germany. |
| 210,362 | 9/1940 | Switzerland. |

LOUIS J. DEMBO, *Primary Examiner.*

KENNETH N. LEIMER, *Examiner.*